United States Patent [19]

Thomason et al.

[11] 4,369,764
[45] Jan. 25, 1983

[54] SOLAR HEAT STORAGE SYSTEM

[76] Inventors: Harry E. Thomason; Harry J. L. Thomason, Jr., both of 609 Cedar Ave., Fort Washington, Md. 20022

[21] Appl. No.: 201,748

[22] Filed: Oct. 29, 1980

[51] Int. Cl.$^3$ .......................... F24H 7/00; F17D 1/00
[52] U.S. Cl. .................................... 126/400; 126/437; 137/265; 137/575
[58] Field of Search ............... 137/265, 262, 563, 575, 137/574, 407; 126/437, 400; 165/104 S

[56] References Cited

U.S. PATENT DOCUMENTS

| | | | |
|---|---|---|---|
| 685,280 | 10/1901 | Hunt | 137/265 |
| 1,509,696 | 9/1924 | Wheeler | 137/265 |
| 2,703,607 | 3/1955 | Simmonds | 137/575 |
| 4,014,461 | 3/1977 | Harvill | 137/265 |

Primary Examiner—Samuel Scott
Assistant Examiner—G. Anderson

[57] ABSTRACT

In a solar heating system, using liquid for heat-transfer or heat-storage or both, the liquid may be lost slowly due to a leaky pipe connection, or a cracked or split absorber plate or collector pipes attached to the absorber of a closed type of collector, by evaporation through broken solar collector glazing of a trickle-flow collector, or such.

A number of schemes have been proposed to provide makeup liquid. One is to allow makeup liquid, such as water, to flow backward from a large heat-storage vessel used during the winter to a smaller one which is the only one in use during the summer. That scheme was disclosed in a patent application filed by Dr. Harry E. Thomason way back in 1961. However, the backflow-connecting pipe had no check valve in it and therefore was of limited value. The present invention resides in several features including placing a check valve in the connecting pipe, and/or placing a flow-restricting device in the interconnecting pipes, and/or using a hole semi-check valve or lightly-loaded pressure-relief valve in the piping, or such, to increase the value of the system as will become apparent hereinafter.

17 Claims, 3 Drawing Figures

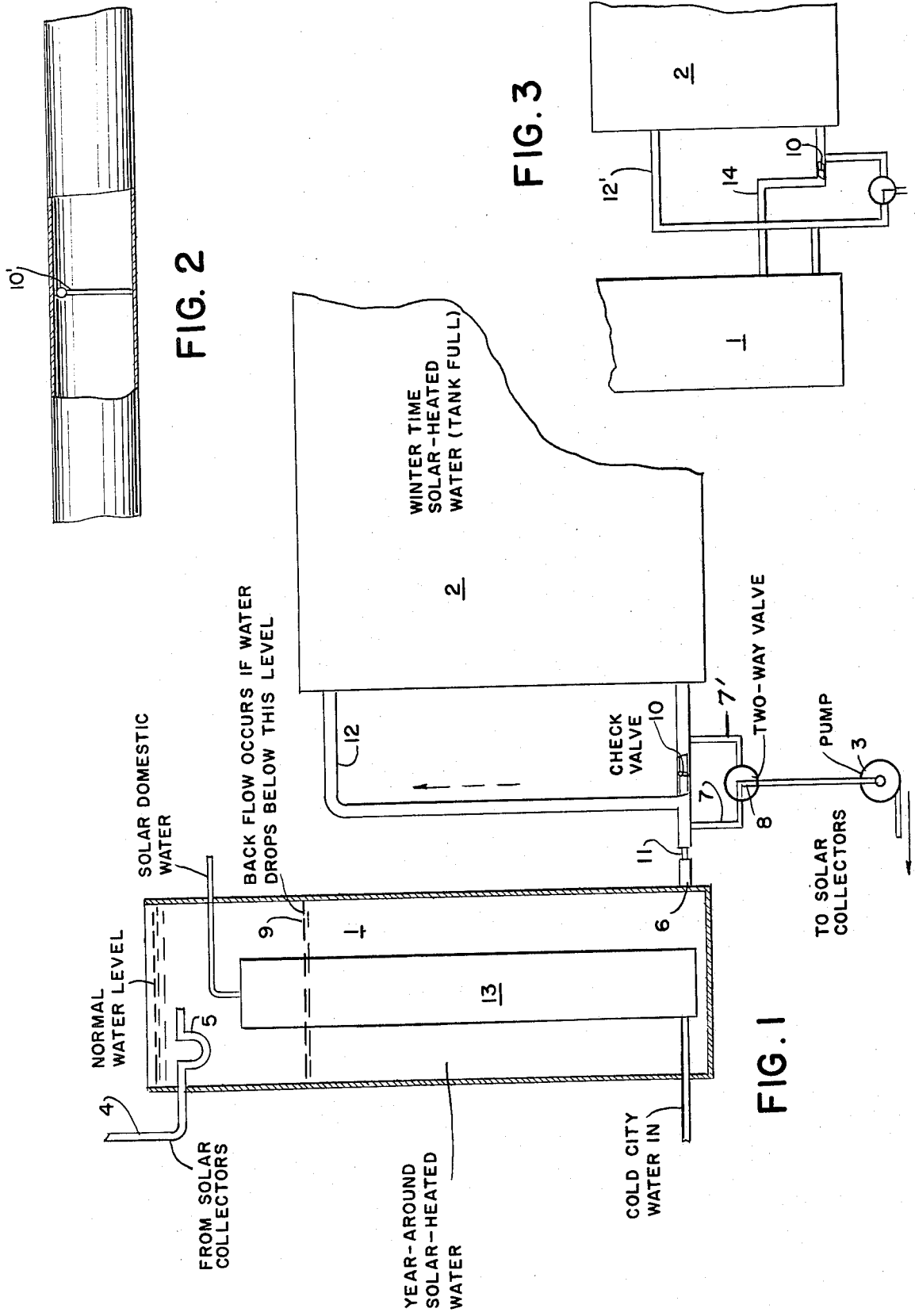

SOLAR HEAT STORAGE SYSTEM

BRIEF DESCRIPTION

In U.S. Pat. No. 3,236,294, Harry E. Thomason addressed the problem of loss of liquid from the heat storage system of solar collection and storage apparatus. That patent discloses a large main (wintertime) heat-storage tank 42 and a smaller domestic water-heating tank 65, which is used along with tank 42 during the winter, but which is used during the summer to store solar heat. for D.H.W. while tank 42 is used to store nocturnally-produced "cold". Pipe 73 interconnects tanks 42 and 65 so that water may flow "backward" from tank 42 to 65 when makeup water is required.

The problem comes when the water is low in the larger tank 42. Even if it is almost full, but some space remains above the water level in tank 42, the water in tank 65 will drain down to the level of interconnecting pipe 73. Then, further water loss could leave tank 65 without further makeup water. Consequently; 1. Tank 65 could run out of water even if tank 42 still had a substantial amount of water in it; 2. Storage capacity is reduced for domestic water heating because tank 65 is not full of solar-heated water and; 3. The heat exchange rate is reduced as it is being imparted from the solar-heated water in tank 65 to the D.H.W. inside of smaller tank 66. By placing a one-way check valve in the interconnecting line, the basic problems are solved. By adding a restriction in the line interconnecting the two interconnected tanks, water from the wintertime storage tank will be drawn more freely when the circulating pump starts. Consequently, makeup water will be sent to the solar heat collectors by the pump which draws rather freely from the wintertime tank but not as freely from the D.H.W. tank. The result is that water from the wintertime tank will be pumped to the solar collectors. It will flow back into the D.H.W. tank at a higher level. The net result is that the water is transferred "uphill" to the higher level in the D.H.W. tank to assure that the level is always high.

IN THE DRAWING

FIG. 1 discloses the basic invention in a cross-sectional diagram.

FIG. 2 discloses a modification of the invention.

FIG. 3 discloses another modification of the invention.

DETAILED DESCRIPTION

Water or other liquid is circulated from tank 1 or tank 2 by pump 3 to solar heat-collectors (not shown). The solar-heated water returns by pipe 4 through trap 5 and flows through tank 1 out at outlet 6.

From outlet 6 the water may flow by pipe or branch line 7 to two-way valve 8 back to the collectors, circulated by pump 3. That would be normal operation for summertime when tank 1 is hot and tank 2 is full or partially full and cool, or empty. During that mode of operation, recirculation is all that is needed. However, if a leaky connection or other slow-loss of water should occur, within a month or two (more or less), the water level in tank 1 could drop to level 9. Below that level, assuming tank 2 to be full, water can backflow through check valve 10 to tank 1. Or, makeup water can be drawn from tank 2 through check valve 10 by pump 3 and sent to the solar collectors to return to tank 1 until the level rises in tank 1. As the water level rises in tank 1 the back pressure on check valve 10 increases and it closes. That tends to assure that the water in tank 1 will always be up to the level of crossover pipe 12. However, relative water levels will depend on several factors such as the pressure required to open check valve 10, restrictions in pipes and fittings, etc. The following will help explain:

EXAMPLE NO. 1

Assume virtually no restrictions in the plumbing. Assume that tank 1 is 6 feet high and the top of tank 2 is 4 feet high, and tank 2 is full. That means a water level difference of two feet, which means a "normal" back pressure on check valve 10 of about 1 pound per square inch. Assume that check valve 10 opens at one pound pressure, or a little less. Water will not flow through it until the water level drops in tank 1 to about four feet below its "normal" or full-level. At that point, check valve 10 will open to allow water to flow through. Therefore, the water in tank 1 cannot be completely depleted as long as tank 2 is substantially filled.

EXAMPLE NO. 2

Now, a possible problem occurs if tank 2 is near empty. The pressure exerted on check valve 10 may not be sufficient to push it open. Consequently, as a result of water loss from the system, tank 1 could become empty even though tank 2 still has water in it. By placing a restriction device 11 in the pipe leading out of tank 1, pump 3 will draw water less freely from tank 1 (and more freely from tank 2), to thereby open check valve 10. Indeed, by proper sizing of the pump, flow-rate, resistance of check valve 10 as compared with resistance of restrictor 11, etc., water can be drawn predominantly from tank 2 until the level in tank 1 is restored up to the top of crossover pipe 12.

Some check valves are gravity-closed, or pre-set spring-tension-closed. In some installations the tanks may be at levels which are only inches different, while others could be at levels several feet, or scores of feet different. Check valve 10 will be selected, or adjusted, to open at the proper pressure. If careful engineering principles are not observed, then tank 1 could be drained dry without water from tank 2 opening check valve 10. Restrictor 11, properly sized to reduce flow from tank 1, can help cause water from tank 2 to be drawn past check valve 10 to alleviate that problem.

EXAMPLE NO. 3

Supposing tank 2 to be in a cold storage bin where it is important to keep it cold, a problem could arise. If tank 2 becomes less-than-full, hot water from tank 1 could flow over into tank 2 and waste stored heat and stored "cold" by introducing hot water into cold tank 2. To prevent that problem, the tops of the tanks may be set at near the same level. Or, crossover pipe 12 may have a "hump" or inverted trap, or may be located at a level almost as high as the top of tank 1. That will prevent hot water from flowing from tank 1 to tank 2 during the summer, but it can flow during the winter because water is then being pumped out of tank 2 and it has no other place to go except from tank 1 up and through crossover pipe 12.

In some instances a vent may be necessary or important at the top of the "hump" or inverted trap to prevent a siphoning of water from tank 1 to tank 2 when the latter is less-than-full.

FIG. 2 discloses an alternative which we may call a double semi-check valve 10'. It is loaded so as to be openable from one side whenever a predetermined pressure differential occurs, or from the other side when a predetermined pressure occurs from that side.

EXAMPLE 1

Suppose tanks 1 and 2 are not completely full. Double semi-check valve 10' may open whenever tank 1 is almost full and tank 2 is down to a rather low level below the water level in tank 1 of, say 4 feet. That prevents tank 1 from overfilling due to a surge by allowing the excess to flow both up and over crossover pipe 12 and also to push valve 10' open so the water may flow more freely into tank 2.

EXAMPLE 2

Suppose tank 2 is almost full and the water level in tank 1 is lower, say 2 feet lower. Double check valve 10' may open to allow water to flow from tank 2 and prevent tank 1 from being pumped dry.

Double semi-check valve 10' may be spring-loaded or otherwise manufactured to be opened at any predetermined pressure differential. Or, one side, or both sides, may be adjustable to allow for opening at one pressure or at other pressures to suit the particular tank levels and liquid levels to be maintained in the tanks.

Double semi-check valve 10' may be thought of as a double pressure relief valve. It will open as the pressure in either tank exceeds that in the other tank by a certain amount.

During wintertime operation, two-way valve 8 is turned to draw water from tank 2 through branch line 7'. Pump 3 sends it to the collectors. Hot water returns to tank 1 via return line 4. From tank 1 it flows through outlet 6 and crossover pipe 12 to tank 2. That heats the water in both tanks, and also in domestic water tank 13 because it is bathed in solar-heated water.

Trap 5 of value in holding a water "seal" so that steam or hot water vapor does not go up pipe 4 like a chimney. When water or other liquid in tank 1 is hot (say 150° to 175°), "steam" or water vapor could waste a great amount of heat, and some water vapor which means a loss of liquid, up the pipe from the collectors.

For convenience of explanation we have described check valve 10 (or 10') and restrictor 11 as being in what we may call a first branch line interconnecting tanks 1 and 2. (A second branch line includes crossover line 12.) Obviously the restrictor and/or check valve could be located at other places in order to practice the invention, such as inside of the tanks or at the outlet of tank 1 or tank 2.

FIG. 3 illustrates a modification where second branch line 12' is connected from a point adjacent to the bottom of tank 1 to a point adjacent to the top of tank 2. The first branch line 14 includes the check valve 10 and is connected from a point adjacent to the bottom of tank 1 to a point adjacent to the bottom of tank 2.

Check valve 10 may be replaced by a power-operated valve, for example, a solenoid valve. A sensor device in tank 1, such as a float-controlled switch, will open the valve whenever the water in tank 1 drops to a predetermined level. That allows water from tank 2 to be pumped to the solar collectors, from which it returns to tank 1 until the water is restored to the desired level in tank 1.

We claim:

1. A liquid solar-heat storage tank system comprising a first tank and a second tank, means inter-connecting said tanks comprising liquid conduits including a first branch line connected adajacent to the bottoms of said tanks, a check valve in said first branch line closable to prevent flow from said first tank to said second tank and openable to permit flow from said second tank to said first tank, and a second branch line connected adjacent to the bottom of said first tank and the top of said second tank to permit liquid to flow from the bottom portion of said first tank to the top portion of said second tank when the level of liquid in said first tank is higher than the level of liquid in said second tank and higher than the highest point of said second branch line.

2. A storage tank system as in claim 1 and a restrictor in said first branch line.

3. A storage tank system as in claim 2, and a third branch line connected to said first branch line at a point between said check valve and said restrictor.

4. A storage tank system as in claim 3, and pumping means connected to said third branch line.

5. A storage tank system as in claim 1, and a branch line connected to said first branch line at a point between said check valve and said second tank.

6. A storage tank system as in claim 5 and pumping means connected to said branch line.

7. A storage tank system as in claim 1, and a third branch line connected to said first branch line at a point between said check valve and said first tank.

8. A storage tank system as in claim 7 and pumping means connected to said third branch line.

9. A storage tank system as in claim 1, said check valve resisting flow from said first tank to said second tank to force liquid flowing from said first tank to flow through said second branch line to its connecting point adjacent to the top of said second tank.

10. A storage tank system as in claim 1 and two additional branch lines, one connected to said first branch line at a point between said check valve and said second tank, the other connected to said first branch line at a point between said check valve and said first tank, pumping means to circulate liquid through said tanks and branch lines, and valve means to direct flow through one or the other of the two additional branch lines.

11. A storage tank system as in claim 1, said check valve being openable due to pressure from one side, or from the opposite side.

12. A storage tank system as in claim 11 and third and fourth branch lines, said fourth being connected to said first branch line at a point between said check valve and said second tank, said third being connected to said first branch line at a point between said check valve and said first tank, pumping means to circulate liquid through said tanks and branch lines, and valve means to direct flow through one or the other of the third and fourth branch lines.

13. A storage tank system as in claim 12 and a restrictor in said first branch line at a location between said first tank and said check valve with said third branch line being connected to said first branch line at a location between said restrictor and said check valve.

14. A storage tank system as in claim 8, and a restrictor in said first branch line.

15. A storage tank system as in claim 9, and a third branch line connected to said first branch line at a point between said check valve and said restrictor.

16. A storage tank system as in claim 10, and pumping means connected to said third branch line.

17. A storage tank system as in claim 8 and a branch line connected to said first branch line at a point between said check valve and said second tank.

* * * * *